(12) United States Patent
Cleaver et al.

(10) Patent No.: US 11,494,792 B2
(45) Date of Patent: Nov. 8, 2022

(54) PREDICTIVE DECISION MAKING BASED ON INFLUENCE IDENTIFIERS AND LEARNED ASSOCIATIONS

(71) Applicant: KYNDRYL, INC., New York, NY (US)

(72) Inventors: James David Cleaver, Grose Wold (AU); Michael James McGuire, Sydney (AU); Thuy Luong, Kellyville (AU); Mary Kathryn Aldridge, Washington, DC (US)

(73) Assignee: Kyndryl, Inc., New York, NY (US)

( * ) Notice: Subject to any disclaimer, the term of this patent is extended or adjusted under 35 U.S.C. 154(b) by 120 days.

(21) Appl. No.: 16/823,408

(22) Filed: Mar. 19, 2020

(65) Prior Publication Data
US 2021/0295357 A1 Sep. 23, 2021

(51) Int. Cl.
G06Q 30/02 (2012.01)
(52) U.S. Cl.
CPC .............................. G06Q 30/0202 (2013.01)
(58) Field of Classification Search
None
See application file for complete search history.

(56) References Cited

U.S. PATENT DOCUMENTS

| | | |
|---|---|---|
| 7,433,854 B2 | 10/2008 | Joseph |
| 7,653,568 B2 | 1/2010 | Keller |
| 8,312,056 B1 | 11/2012 | Peng |
| 9,569,729 B1 | 2/2017 | Oehrle |
| 9,684,868 B2 | 6/2017 | Lawrence |
| 9,946,975 B2 | 4/2018 | Paul |
| 10,939,248 B1* | 3/2021 | Aldridge ............... H04W 4/029 |
| 2009/0112786 A1* | 4/2009 | Abels .................... G06N 5/025 706/47 |
| 2011/0282758 A1 | 11/2011 | Jacobi |

(Continued)

FOREIGN PATENT DOCUMENTS

CN 103559207 A 2/2014

OTHER PUBLICATIONS

Schroder (Influencer Fraud on Instagram, A Descriptive Analysis of the World's Largest Engagement Community, Master Thesis, Mannheim, Jan. 25, 2019, pp. 1-146).*

(Continued)

Primary Examiner — Matthew D Henry
(74) Attorney, Agent, or Firm — Erik Swanson; Matthew M. Hullhan; Heslin Rothenberg Farley & Mesiti PC (57) ABSTRACT

Machine logic for causing a computer system to perform the following operations (not necessarily in the following order): (i) receiving, by a historical decisions and opinions data store, decisions and opinions that have been communicated, propagated and/or otherwise espoused by a first entity; (ii) receiving, by an influencer data store, a plurality of influencer data sets, with each influencer data set including information indicative of opinions expressed by a respectively corresponding influencer; (iii) performing, by reverse chain engine, reverse chaining using the following inputs: (a) data of the historical decisions and opinions data store, and (b) the plurality of influencer data sets; and (iv) predicting, by a prediction engine, a likely future decision of the first entity using output of the reverse chaining operation.

18 Claims, 5 Drawing Sheets

(56) References Cited

U.S. PATENT DOCUMENTS

| | | |
|---|---|---|
| 2012/0316916 A1 | 12/2012 | Andrews |
| 2013/0138577 A1 | 5/2013 | Sisk |
| 2013/0166540 A1* | 6/2013 | Ganesh ................ G06F 16/951 707/722 |
| 2015/0235137 A1* | 8/2015 | Lawrence .......... G06Q 30/0201 706/12 |
| 2016/0371586 A1* | 12/2016 | Linehan ................ G06N 20/00 |
| 2019/0114651 A1 | 4/2019 | Eyal |
| 2019/0188733 A1 | 6/2019 | Rao |

OTHER PUBLICATIONS

Morgan, Jasmine, "Pinpointing Social Media Influencers with Predictive Analytics", Geospatial World, Sep. 26, 2018, 4 pages, <https://www.geospatialworld.net/blogs/pinpointing-social-media-influencers-with-predictive-analytics/>.

* cited by examiner

DASHBOARD FOR TRACKING INFLUENCE

PAST EXECUTIVE DARLA DECISION:
    PUT ALL OF COMPANY'S MONEY INTO A SINGLE PENNY STOCK

~402

REVERSE CHAINING TO FIND KEY INFLUENCERS:

| INFLUENCER | WEIGHT | THEME(S) |
|---|---|---|
| 1. COMMENTATOR ABEL | 34% | TAKE HUGE RISKS |
| 2. COMMENTATOR BAKER | 33% | THE BIGGEST UNTAPPED SOURCE OF VALUE IS PENNY STOCKS |
| 3. COMMENTATOR CAROL | 33% | MAINTAIN A UNIFORM AND HOMOGENEOUS INVESTMENT PORTFOLIO |

~404

PREDICTION OF FUTURE EXECUTIVE DARLA DECISION:
    DO A STOCK SPLIT OF COMPANY STOCKS SO THAT THEY BECOME PENNY STOCKS

PREDICTIVE DECISION MAKING BASED ON INFLUENCE IDENTIFIERS AND LEARNED ASSOCIATIONS

BACKGROUND

The present invention relates generally to the field of computer systems that can make decisions and also to the field of identifying "influencers" and the people and things that the influencers influence.

The Wikipedia entry for "influencer marketing" (as of 16 Feb. 2020) states, in part, as follows: "Influencer marketing (a.k.a. influence marketing) is a form of social media marketing involving endorsements and product placement from influencers, people and organizations who have a purported expert level of knowledge or social influence in their field. Influencer content may be framed as testimonial advertising; influencers play the role of a potential buyer, or may be involved as third parties. These third parties can be seen in the supply chain (such as retailers or manufacturers) or as value-added influencers, such as journalists, academics, industry analysts, and professional advisers . . . . Most discussions of social influence focus on social persuasion and compliance. In the context of influencer marketing, influence is less about arguing for a point of view or product than about loose interactions between parties in a community (often with the aim of encouraging purchasing or behavior). Although influence is often equated with advocacy, it may also be negative . . . . There is a lack of consensus about what an influencer is. One writer defines them as 'a range of third parties who exercise influence over the organization and its potential customers.' Another defines an influencer as a 'third party who significantly shapes the customer's purchasing decision but may never be accountable for it.' According to another, influencers are 'well-connected, create an impact, have active minds, and are trendsetters.' And just because an individual has a large number of follows does not necessarily mean they have a large number of influence over those individuals, only that they have a large number of followers . . . . Sources of influencers vary. Marketers target easily-identifiable influencers, such as journalists, industry analysts, and high-profile executives. For most business-to-consumer (B2C) purchases, influencers may include people known to the purchaser and the retail staff. In high-value business-to-business (B2B) transactions, influencers may be diverse and might include consultants, government-backed regulators, financiers, and user communities." (footnotes omitted)

For purposes of this document, an "influencer" is defined to be an individual, or collection of individuals, that meet any of the alternative definitions provided in the previous paragraph.

SUMMARY

According to an aspect of the present invention, there is a method, computer program product and/or system that performs the following operations (not necessarily in the following order): (i) receiving, by a historical decisions and opinions data store, decisions and opinions that have been communicated, propagated and/or otherwise espoused by a first entity; (ii) receiving, by an influencer data store, a plurality of influencer data sets, with each influencer data set including information indicative of opinions expressed by a respectively corresponding influencer; (iii) performing, by reverse chain engine, reverse chaining using the following inputs: (a) data of the historical decisions and opinions data store, and (b) the plurality of influencer data sets; and (iv) predicting, by a prediction engine, a likely future decision of the first entity using output of the reverse chaining operation.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
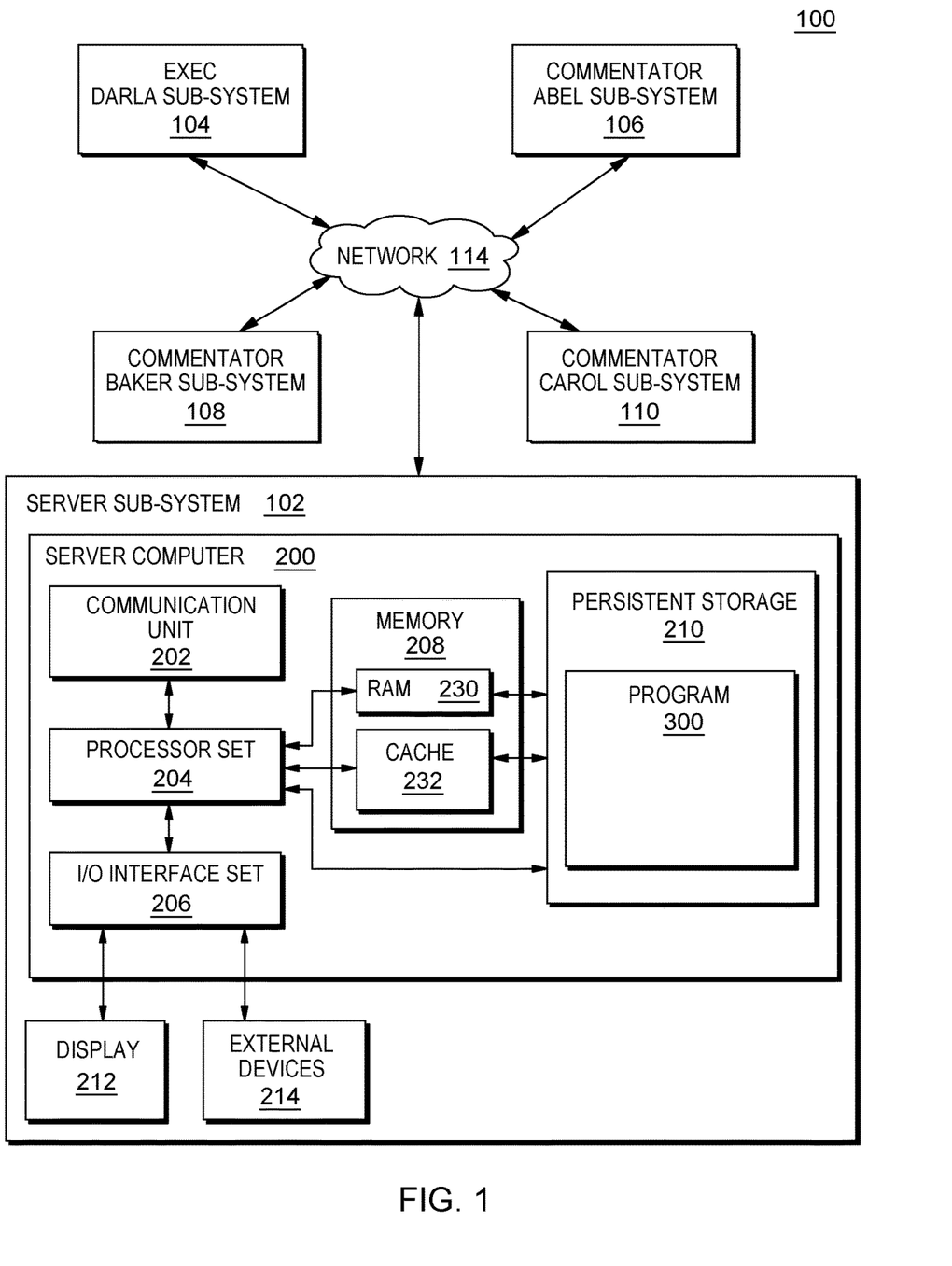
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); executive Darla subsystem 104; commentator Abel subsystem 106; commentator Baker subsystem 108; commentator Carol subsystem 110; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
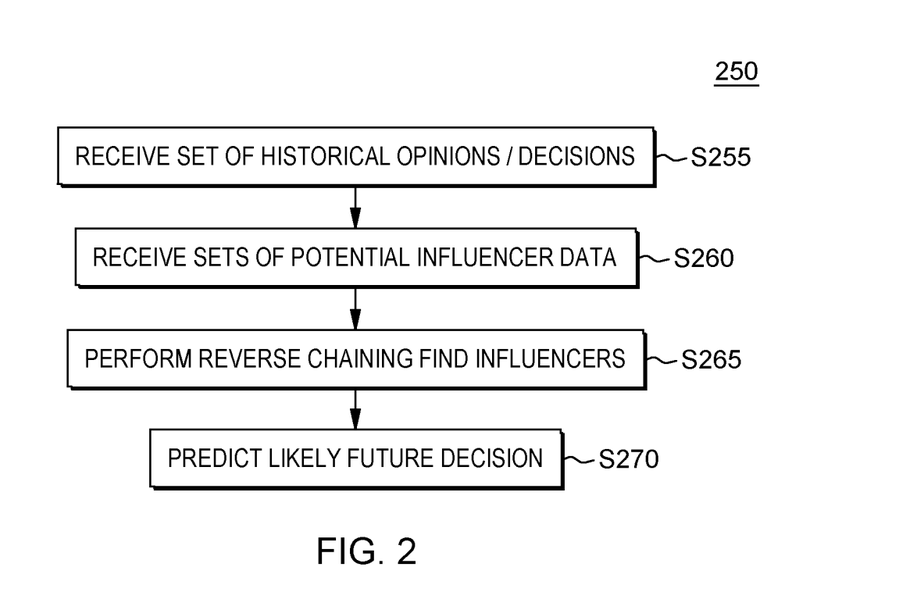
FIG. 2 is a flowchart showing a first embodiment method performed, at least in part, by the first embodiment system.
Figure 3:
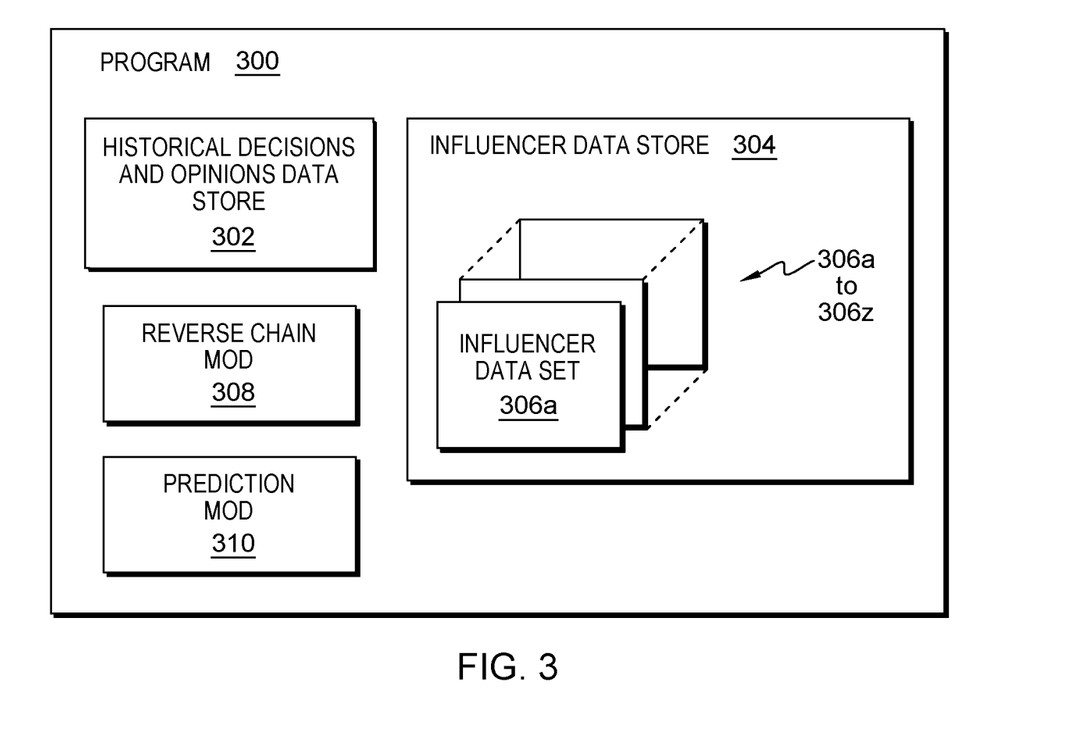
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Figure 4:
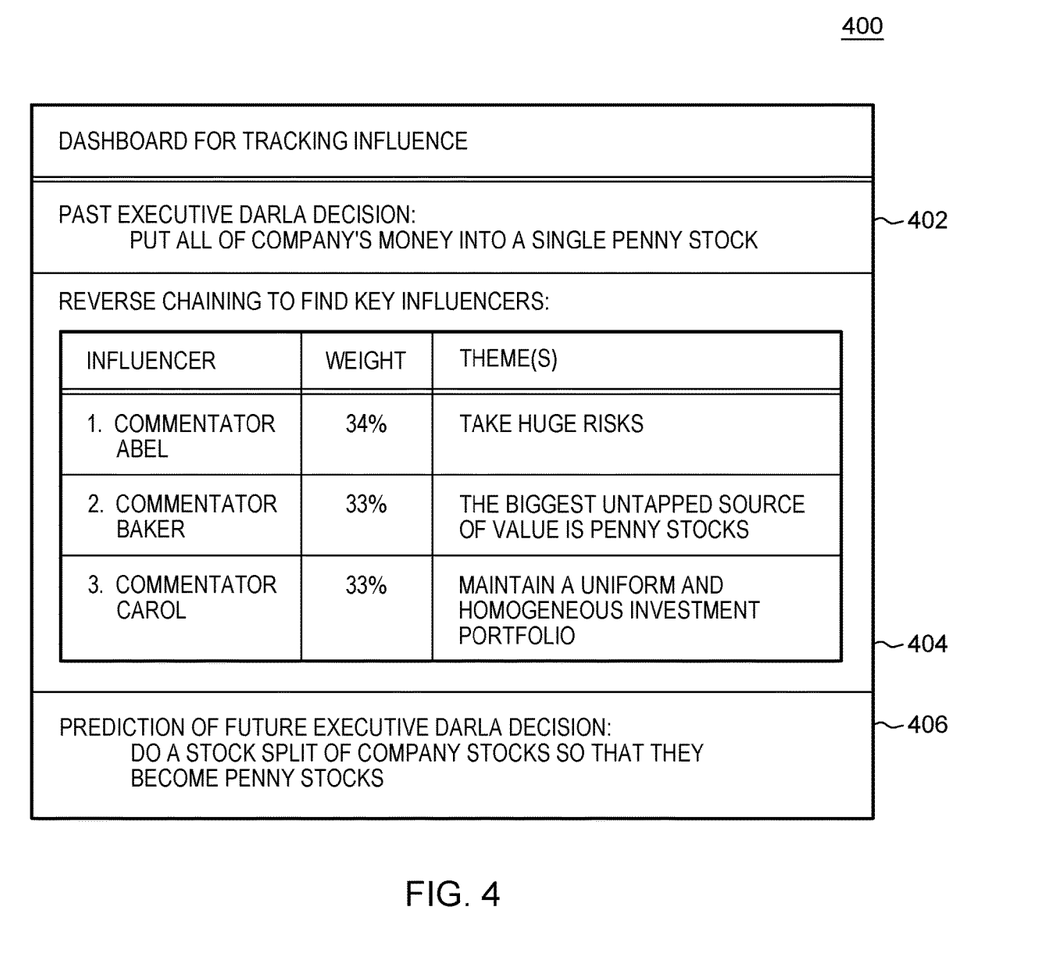
FIG. 4 is a screenshot view of a dashboard display generated by the first embodiment system.

Processing begins at operation S255, where historical decisions and opinions data store 302 receives historical decisions and opinions that have been communicated, propagated and/or otherwise espoused by executive Darla. More specifically, these opinions and decisions are received by data store 302 through communication network 114 and from executive Darla subsystem 104 (which, in this example, is executive Darla's internet-connected tablet computer. In this simple example, only one of executive Darla's previous decisions is received, as shown in FIG. 4 at region 402 of dashboard display 400. In this example, the previous decision espoused by executive Darla is: "Put all of company's money into a single penny stock." In this simple example, this decision is simply entered manually by executive Darla in a response to a query about recent decisions of which she feels proud. Other ways of determining historical decisions/opinions re identified, below, in the next subsection of this Detailed Description section in its discussion of FIG. 6.

Processing proceeds to operation S260, where influencer data store 304 receives a plurality of influencer data sets 306a to 306z. More specifically, this information is received through communication network 114 and from: commentator Abel subsystem 106, commentator Baker subsystem 108, commentator Carol subsystem 110 and subsystems of other commentators (not separately shown in FIG. 1). Each influencer data set 306a to 306z includes information indicative of opinions expressed by the commentator, along with an indication of how strongly the commentator holds each of the opinions identified in her data set.

It is noted that, at least in this example, the influencers, which is to say Commentator Abel, Commentator Baker and Commentator Carol, are well-educated business experts and well-credentialed authors. Most of their historical opinions are expressed in serious scholarly journals and subscription publications directed to an audience of high level executives. Alternatively or additionally, these historical opinions could come from more casual, less professional media and online social media outlets.

Processing proceeds to operation S265 where reverse chain module ("mod") 308 performs reverse chaining, by machine logic, using the following inputs: (i) the historical decisions/opinions of the subject individual (in this example, executive Darla); and (ii) the opinions of various commentators in data sets 306a to 306z of data store 304. The operation of reverse chaining is discussed in more detail in the discussion of reverse/backward chaining engine 522 of system 500 of FIG. 5, discussed, below, in the next subsection of this Detailed description section.

In this example, the result of this reverse chaining operation is shown in the reverse chaining portion 404 of dashboard screen shot 400 of FIG. 4. More specifically: (i) commentator Abel is determined to be a key influencer on executive Darla; (ii) commentator Abel's often expressed theme, "take huge risks," is deemed to be a 34% influence on executive Darla's historical decision to put all of the company's money into a single penny stock; (iii) commentator Baker is determined to be a key influencer on executive Darla; (iv) commentator Baker's often expressed theme, "biggest source of value is penny stocks," is deemed to be a 33% influence on executive Darla's historical decision to put all of the company's money into a single penny stock; (v) commentator Carol is determined to be a key influencer on executive Darla; and (vi) commentator Carol's often expressed theme, "uniform and homogeneous investment portfolio," is deemed to be a 33% influence on executive Darla's historical decision to put all of the company's money into a single penny stock.

Processing proceeds to operation S270 where prediction mod 310 predicts, by machine logic, a likely future decision of executive Darla using the outputs of the reverse chaining operation S265. As shown in prediction portion 406 of dashboard screen shot 400, executive Darla is predicted to: "do a stock split of the company stocks until they become penny stocks." This prediction can be used to take further actions related to the prediction. For example, in this example, executive Darla is given remedial training to teach her that splitting the company stocks down to penny stocks is not typically an optimal approach when running a company.

III. Further Comments and/or Embodiments

Some embodiments of the present invention recognize the following facts, potential problems and/or potential areas for improvement with respect to the current state of the art: (i) often when talking to chief level executives, these individuals will talk about pain points/problem statements with a particular kind of language or use of words; (ii) often it is possible to check the phrases that they have used and then identify likely people that have been key influences on who and what have framed the problems that they are seeing; (iii) people usually try to infer what a solution to a particular problem is, however, the underlying weighting towards different components of the solution is often not understood; and/or (iv) at a trivial level this may be that a C-level is more interested in customer service, or risk of brand degradation than cost.

Some embodiments of the present invention may include one, or more, of the following operations, features, characteristics and/or advantages: (i) helps to identify key influencers are; (ii) predicts the problems and solutions that key influencer would recommend in the short to mid-term future; (iii) solves a problem by being passed either from analyzing the written or spoken text the key phrases or messages from the identified chief level executive (herein sometimes referred to as a "C level exec"); (iv) looks up sources/articles/media transcripts based on the phrases used; (v) identifies likely key influencers based on the phrases used; and/or (vi) predicts likely next problems of interest to the c level exec and/or the most preferred solution option(s) by use of: (a) reverse chaining techniques across the collection of information from the C level exec's themselves, and/or (b) the collection of information from the potential key influencers.

According to an embodiment of the present invention, a user sees a display on a display device. The display shows a dashboard type visual presentation. The dashboard shows: (i) the logic and the weightings on the assumptions that led to the decision that was made (for example, made by the CIO (chief information officer)); and (ii) another section of the dashboard type visual presentation, called the "prediction-related dashboard portion." The prediction-related dashboard portion includes a prediction that a given C level exec would make based on its understanding of the weightings and the logic. This prediction-related dashboard portion provides a traceability of the C level exec's decision and/or statement back to the data expected to have driven that decision.

An embodiment of a computer system according to the present invention includes the following components: (i) text/speech to text utterances/outcomes from an identified C level exec; (ii) Media/Social media/publications crawler to identify sources/key influences of key utterances; (iii) reverse/backward chaining engine for identification of possible assumptions, and bias initial conditions based on the identified utterances/outcomes from the C level exec and the sources/key influencers; (iv) prediction engine to assess the most likely acceptable solution based on the now known/inferred initial conditions and assumptions; and (v) prediction engine to determine likely other problem statements the identified C level Exec would have.

A method according to an embodiment of the present invention includes the following operations (not necessarily in the following order): (i) utterances/text analyzed for key messages; (ii) key messages passed to media/social media/publication crawler; (iii) crawler identifies the top likely key influencers and collects their context and information; (iv) for each of the key influencers, and the C Level Exec, the reverse/backward chaining engine is run to identify possible initial conditions and assumptions; (v) comparison is done between the initial conditions and assumptions for each of the key influencers and C level execs statements; (vi) for each of the key influencers, based on the similarity of the influencers and the C level Exec initial conditions and assumptions the most palatable and likely solution are determined; (vii) from the extended viewpoints of the influencers, a prediction can then be made of what the C level exec is likely to raise as concerns in the future.

An example of an instance of the method described in the previous paragraph is as follows: (i) a CIO's written communications, social media posts, and key phrases that they use is input into the system; (ii) the system determines that the views/position of the CIO are very similar to the viewpoints of various influencers/authors in the public domain; (iii) the system determines that key phrases being used by the CIO originated or are heavily used by various influencers/authors in the public domain; (iv) the system uses this information to provide recommendation of which authors, positions, views, topics resonate with the CIO; (v) the system uses this information to identify other positions that the CIO might take, or other concerns/problems that they might have; and (vi) therefore, the user knows which viewpoints/positions resonate with the CIO, and can ensure that in their communications with the CIO they frame their conversation with due consideration of those viewpoints/positions.

Figure 5:
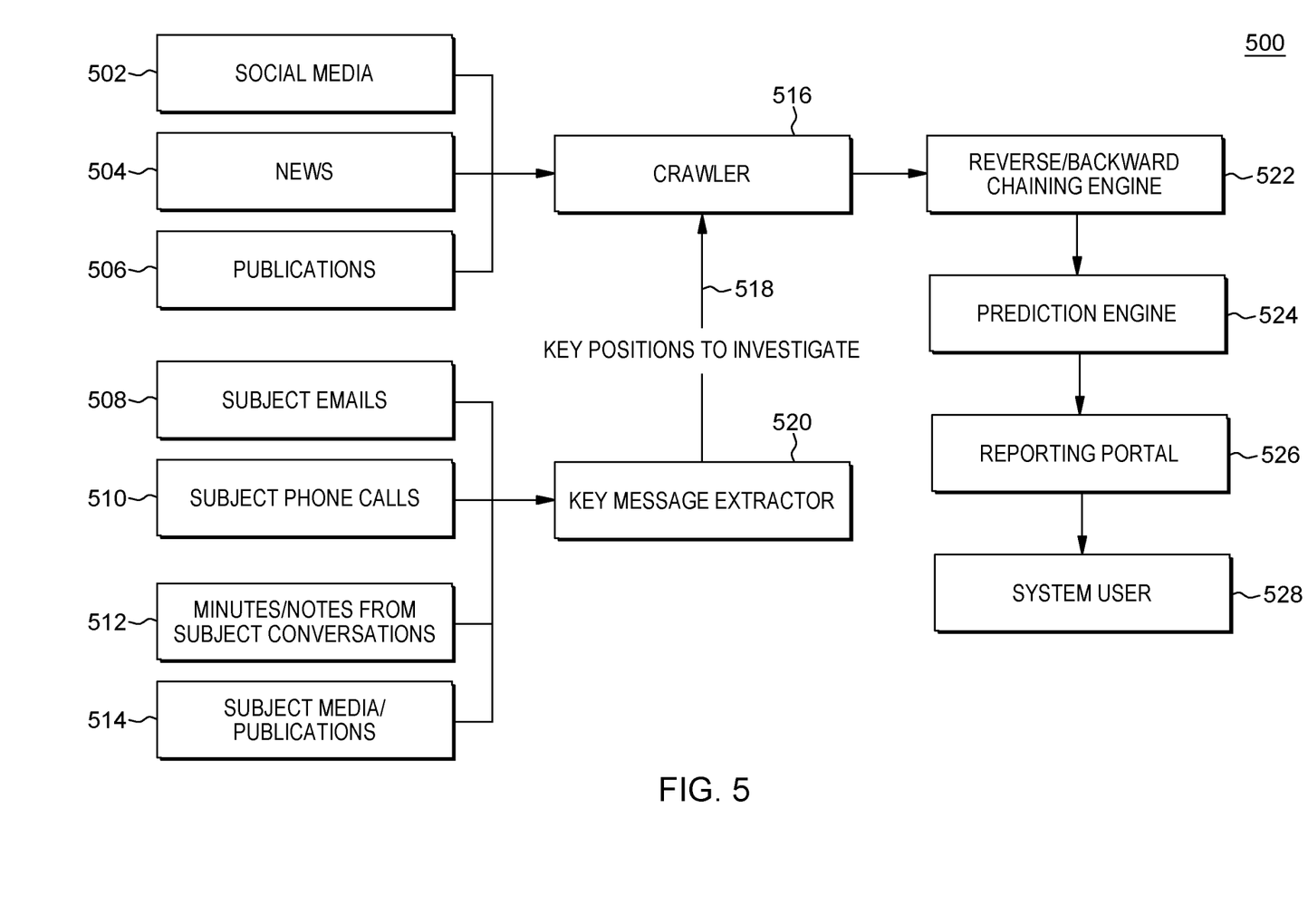
FIG. 5 is a block diagram of a second embodiment of a system according to the present invention.
Figure 6:
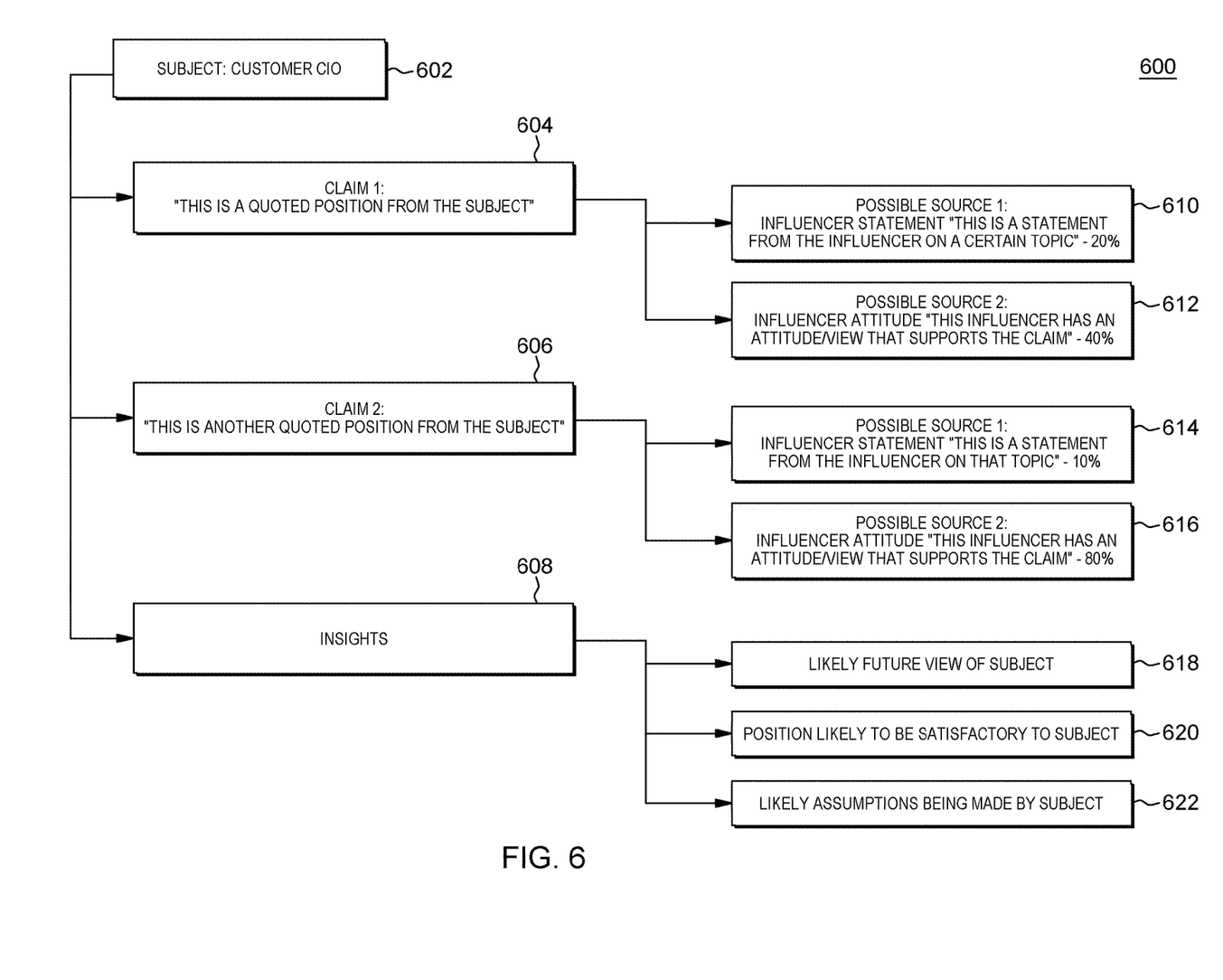
FIG. 6 is a block diagram helpful in understanding some embodiments of the present invention.

As shown in FIG. 5, system 500 includes: social media module 502; news module 504; publications module 506; subject emails module 508; subject phone calls module 510; minutes/notes from subject conversations module 512; subject media/publications module 514; crawler module 516; key position to investigate S18; key message extractor module 520; reverse/backward chaining engine 522; prediction engine 524; reporting portal 526; and system user 528. As shown in FIG. 6, user interface 600 includes: block 602; block 604; block 606; block 608; block 610; block 612; block 614; block 616; block 618; block 620; and block 622.

Some embodiments of the present invention may include one, or more, of the following operations, features, characteristics and/or advantages: (i) inherently determines viewpoints, of a C level exec and her set of influencers, holistically and predicts possible future problems/palatable solutions; (ii) for the majority of situations this kind of problem is solved by single analysis of the problem, with the solution then either applying their own weightings, or guessing at the C levels weightings; (iii) it also means that as it is measured holistically one doesn't fall into the trap of trying to articulate the weightings and then have them changed on condition that the C level doesn't like the response that it gives; (iv) for example, the C-level will state one things is a priority when the system will show that another attribute is; (v) has value to a variety of industries; (vi) the IT (information technology) industry this can help with best aligning palatable agreements to a customer's solution; (vii) for the finance industry it can be used to identify the most likely person someone is following from a stock market perspective; (viii) for the medical/health industry it can be used to ensure that the patient is not just receiving the relay of advice from a particular doctor; (ix) wide ranging analytic power can assist with correctly identifying driving forces behind clients' decisions; (x) helps companies determine the best available option on the table to solve their respective problems; and/or (xi) solution that directly aligns with initiatives of globally-oriented customers.

Some embodiments of the present invention may include one, or more, of the following operations, features, characteristics and/or advantages: (i) is different than technology related to "social medial influencers" because some embodiments of the present invention identify people from their opinions and presence, the thought process and decision making displayed, rather than the product placement, social followers and targeted methods that social media influencers use; (ii) is predicated on understanding thought process rather than simple attributes like "follow"; and/or (iii) based on an understanding of viewpoints and positions, rather than networks.

Some embodiments of the present invention may include one, or more, of the following operations, features, characteristics and/or advantages: (i) is "chained" in the reverse direction; (ii) predicts premises, assumptions, the origins of premises and the origins of assumptions; (iii) the understanding of the premise and assumptions will lead to a better prediction as to how unrelated decisions would be made in the future; (iv) understands the source of the assumptions and opinions and based, at least in part on this understanding, determines who and what is likely able to sway or change the individual's opinion; (v) identifies an individual as being an influencer; (vi) predicts the decisions that someone who is being influenced by the influencer will make; (vii) predicts the conditions and assumptions, as well as the source of these assumptions and conditions; (viii) determines the premise and assumptions as input data for making a prediction as to how unrelated decisions will be made in future; (ix) uses the source of the assumptions and opinions as input data to help determine who and what is likely able to sway or change the individual's opinion; (x) enables an individual to be identified as being an influencer; (xi) predicts the decisions that someone who is being influenced by the influencer will make; and/or (xii) predicts the conditions and assumptions, as well as the source of these assumptions and conditions.

Some embodiments of the present invention may include one, or more, of the following operations, features, characteristics and/or advantages: (i) used to discover who or what is influencing a subject (for example a C level exec); (ii) predicts future behavior as a result of that model; (iii) makes a two (2) component determination including (a) the identification of whom is an influencer, and (b) followed by whom is an influencer for a particular person; (iv) the identification of whom is a an influencer may be performed under currently conventional technology used to identify influencers (that is, influencers in general—not necessarily influencers with respect to a given C level exec); (v) identifying, by machine logic, who a key influencer is for a particular person based on the inferred premise, logic, and decisions; and/or (vi) once the logic steps and weightings of various factors are determined, then machine logic predicts what the next decisions would be.

As a specific example according to item (vi) in the list of the previous paragraph: (a) it is established that a CEO has the mindset that she must get maximum utilization of her data center; (b) therefore, and as such, the CEO is pushing for private on premise cloud, rather than using public cloud, (c) machine logic according to the present invention predicts that this customer is likely to choose to have custom written apps, rather than buy an application as a service, and (d) machine logic according to the present invention further predicts that this customer is likely to buy back up as a service, but would utilize the company's own storage capabilities.

For some embodiments, the focus is on the innovations explained in the later part of this sub-section of the Detailed Description section of this document. In these embodiments, the social media and influence marketing aspects of some embodiments are less relevant.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
   receiving, by a data store via a communication network of computer systems, utterances communicated, propagated and/or otherwise espoused by a first entity, the received utterances comprising natural language text, at least some of the natural language text obtained from speech-to-text conversion, and automatically analyzing the received utterances to obtain key messages of the utterances of the first entity, the key messages obtained from the automated analysis providing historical decisions and opinions of the first entity for maintaining in a historical decisions and opinions data store;
   automatically digitally crawling online electronic sources for utterances of influencers to provide, for an influencer data store, a plurality of influencer data sets, wherein each influencer data set of the plurality of influencer data sets includes information indicative of opinions expressed by a respectively corresponding influencer and electronic information from the electronic sources about the corresponding influencer;
   performing, by a reverse chain engine comprising a processor executing machine logic, reverse chaining based on the key messages obtained from the automated analysis of the received utterances espoused by the first entity and using at least the following inputs: (i) data of the historical decisions and opinions data store, and (ii) the plurality of influencer data sets, the reverse chaining comprising identifying and comparing initial conditions associated with opinions expressed by the influencers, as determined from the crawling, with decisions of the first entity, and ascertaining one or more relevant themes expressed by one or more of the influencers, as key influencers of the first entity, that correlate to one or more of the historical decisions and opinions of the first entity provided by the key messages obtained from the automated analysis of the received utterances including the natural language text obtained from the speech-to-text conversion, and one or more degrees of correlation between the one or more themes and the one or more of the historical decisions and opinions of the first entity; and
   predicting, by a prediction engine, a likely future decision of the first entity using output of the reverse chaining.

2. The CIM of claim 1 wherein first entity is a human individual.

3. The CIM of claim 1 further comprising:
   identifying the influencers; and
   for each influencer of the influencers, making a respectively corresponding influencer data set of the plurality of influencer data sets.

4. The CIM of claim 1 further comprising:
   taking a corrective action based, at least in part, upon the likely future decision of the first entity.

5. The CIM of claim 1 further comprising:
   assembling a dashboard display set including information indicative of a dashboard display that communicates a plurality of outputs in human understandable form and format; and
   displaying the dashboard display on a display device.

6. The CIM of claim 1 wherein the first entity is a corporate executive.

7. A computer program product (CPP) comprising:
   a set of storage device(s); and
   computer code including data and instructions for causing a processor(s) set to perform at least the following operations:
   receiving, by a data store via a communication network of computer systems, utterances communicated, propagated and/or otherwise espoused by a first entity, the received utterances comprising natural language text, at least some of the natural language text obtained from speech-to-text conversion, and automatically analyzing the received utterances to obtain key messages of the utterances of the first entity, the key messages obtained from the automated analysis providing historical decisions and opinions of the first entity for maintaining in a historical decisions and opinions data store;
   automatically digitally crawling online electronic sources for utterances of influencers to provide, for an influencer data store, a plurality of influencer data sets, wherein each influencer data set of the plurality of influencer data sets includes information indicative of opinions expressed by a respectively corresponding influencer and electronic information from the electronic sources about the corresponding influencer;
   performing, by a reverse chain engine comprising at least one processor, of the processor(s), executing machine logic of the computer code, reverse chaining based on the key messages obtained from the automated analysis of the received utterances espoused by the first entity and using at least the following inputs: (i) data of the historical decisions and opinions data store, and (ii) the plurality of influencer data sets, the reverse chaining comprising identifying and comparing initial conditions associated with opinions expressed by the influencers, as determined from the crawling with decisions of the first entity, and ascertaining one or more relevant themes expressed by one or more of the influencers, as key influencers of the first entity, that correlate to one or more of the historical decisions and opinions of the first entity provided by the key messages obtained from the automated analysis of the received utterances including the natural language text obtained from the speech-to-text conversion, and one or more degrees of correlation between the one or more themes and the one or more of the historical decisions and opinions of the first entity; and predicting, by a prediction engine, a likely future decision of the first entity using output of the reverse chaining.

8. The CPP of claim 7 wherein first entity is a human individual.

9. The CPP of claim 7 wherein the computer code further includes data and instructions for causing the processor(s) to perform the following operation(s):
identifying the influencers; and
for each influencer of the influencers, making a respectively corresponding influencer data set of the plurality of influencer data sets.

10. The CPP of claim 7 wherein the computer code further includes data and instructions for causing the processor(s) to perform the following operation(s):
taking a corrective action based, at least in part, upon the likely future decision of the first entity.

11. The CPP of claim 7 wherein the computer code further includes data and instructions for causing the processor(s) to perform the following operation(s):
assembling a dashboard display set including information indicative of a dashboard display that communicates a plurality of outputs in human understandable form and format; and
displaying the dashboard display on a display device.

12. The CPP of claim 7 wherein the first entity is a corporate executive.

13. A computer system (CS) comprising:
a processor(s) set;
a set of storage device(s); and
computer code including data and instructions for causing the processor(s) set to perform at least the following operations:
receiving, by a data store via a communication network of computer systems, utterances communicated, propagated and/or otherwise espoused by a first entity, the received utterances comprising natural language text, at least some of the natural language text obtained from speech-to-text conversion, and automatically analyzing the received utterances to obtain key messages of the utterances of the first entity, the key messages obtained from the automated analysis providing historical decisions and opinions of the first entity for maintaining in a historical decisions and opinions data store;
automatically digitally crawling online electronic sources for utterances of influencers to provide, for an influencer data store, a plurality of influencer data sets, wherein each influencer data set of the plurality of influencer data sets includes information indicative of opinions expressed by a respectively corresponding influencer and electronic information from the electronic sources about the corresponding influencer;
performing, by a reverse chain engine comprising at least one processor, of the processor(s), executing machine logic of the computer code, reverse chaining based on the key messages obtained from the automated analysis of the received utterances espoused by the first entity and using at least the following inputs: (i) data of the historical decisions and opinions data store, and (ii) the plurality of influencer data sets, the reverse chaining comprising identifying and comparing initial conditions associated with opinions express by the influencers, as determined from the crawling with decisions of the first entity, and ascertaining one or more relevant themes expressed by one or more of the influencers, as key influencers of the first entity, that correlate to one or more of the historical decisions and opinions of the first entity provided by the key messages obtained from the automated analysis of the received utterances including the natural language text obtained from the speech-to-text conversion, and one or more degrees of correlation between the one or more themes and the one or more of the historical decisions and opinions of the first entity; and
predicting, by a prediction engine, a likely future decision of the first entity using output of the reverse chaining.

14. The CS of claim 13 wherein first entity is a human individual.

15. The CS of claim 13 wherein the computer code further includes data and instructions for causing the processor(s) to perform the following operation(s):
identifying the influencers; and
for each influencer of the influencers, making a respectively corresponding influencer data set of the plurality of influencer data sets.

16. The CS of claim 13 wherein the computer code further includes data and instructions for causing the processor(s) to perform the following operation(s):
taking a corrective action based, at least in part, upon the likely future decision of the first entity.

17. The CS of claim 13 wherein the computer code further includes data and instructions for causing the processor(s) to perform the following operation(s):
assembling a dashboard display set including information indicative of a dashboard display that communicates a plurality of outputs in human understandable form and format; and
displaying the dashboard display on a display device.

18. The CS of claim 13 wherein the first entity is a corporate executive.

* * * * *